July 16, 1963 C. V. DYE 3,097,862
TRAILER STABILIZING AND SUSPENSION ASSEMBLY
Filed Nov. 8, 1960 2 Sheets-Sheet 1

INVENTOR.
CLYDE V. DYE
BY Ely, Frye & Hamilton
ATTORNEYS

July 16, 1963 C. V. DYE 3,097,862
TRAILER STABILIZING AND SUSPENSION ASSEMBLY
Filed Nov. 8, 1960 2 Sheets-Sheet 2
FIG. 3
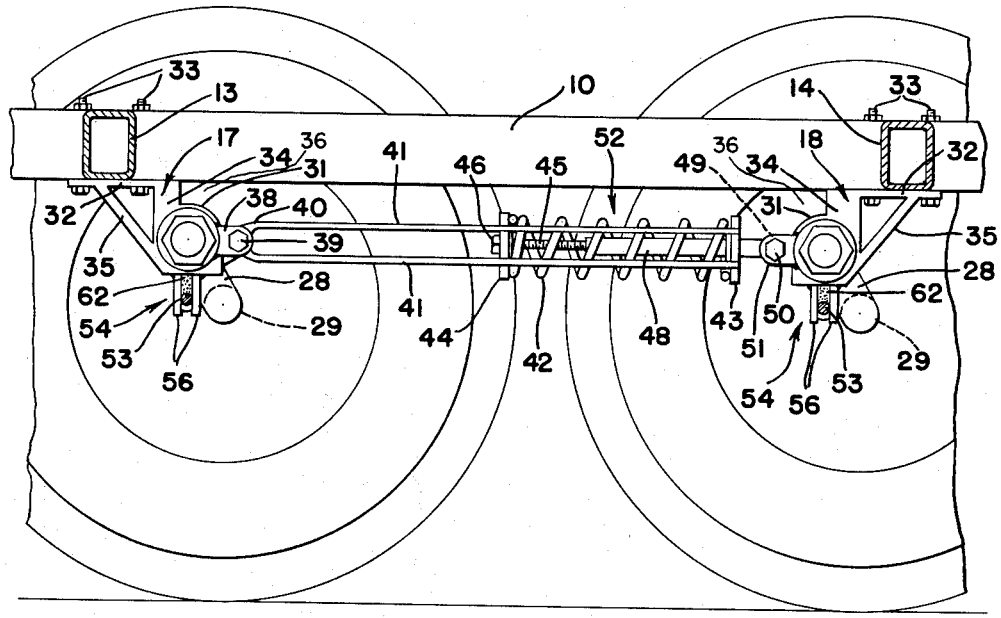
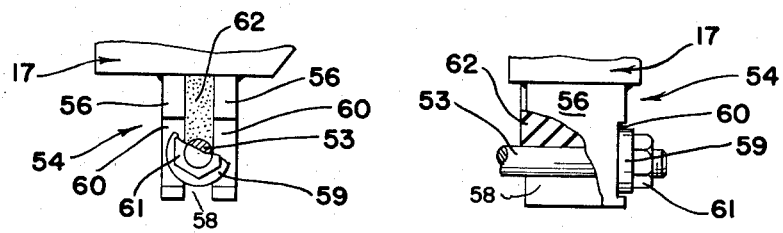
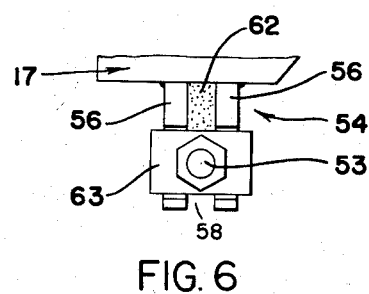
FIG. 4  FIG. 5
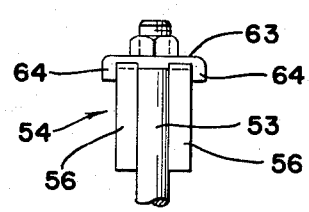
FIG. 6  FIG. 7
INVENTOR.
CLYDE V. DYE
BY *Ely, Frye & Hamilton*
ATTORNEYS

United States Patent Office 3,097,862
Patented July 16, 1963

3,097,862
TRAILER STABILIZING AND SUSPENSION
ASSEMBLY
Clyde V. Dye, 436 Wildwood Ave., Akron 20, Ohio
Filed Nov. 8, 1960, Ser. No. 68,014
8 Claims. (Cl. 280—104.5)

The invention relates generally to a stabilizer for trailer vehicles and a complementary spring suspension. More particularly, the invention relates to a pre-stressed trailer stabilizing assembly and a complementary spring suspension especially adapted for tandem wheels mounted on individual floating axles.

Certain prior constructions employing independent floating axles have necessitated unduly complicated and expensive trailer frame stabilization. Furthermore, the spring suspension assemblies in which the spring and linkage systems interconnected the axles were similarly unduly complex.

As applied to a trailer, the present construction is simple and compact and provides a stable frame with a low bed.

Another object is to provide a simplified frame stabilizing construction which imparts torsional rigidity to the frame to counteract any swaying or weaving of the trailer engendered by unequal or shifting loads.

Other objects include providing a spring suspension which distributes the load, receives impacts and transmits impacts equally between the front and rear wheels of a tandem pair mounted on individual floating axles, and at the same time provides firm and limited springing and damps backlash.

A further object is to provide a construction which permits operation of the trailer with one wheel or one of each pair of tandem wheels temporarily removed.

These and other objects are accomplished by the improvements comprising the present invention, a preferred embodiment of which is shown by way of example in the accompanying drawing and described in detail in the following specification. Various modifications and changes in construction are comprehended within the scope of the invention as defined in the appended claims.

In general a trailer according to the present invention employs independent floating axles each having a wheel journaled thereon and disposed in tandem. The front and rear axles in each tandem pair are interconnected by a spring suspension assembly which distributes the rotational force acting on one axle between the two.

A stabilizing rod preferably connects the axle mounting brackets of the front wheels of the tandem pair on each side of the trailer and a similar rod preferably connects the axle mounting brackets of the rear wheels of the tandem pair on each side of the trailer. A tension rod connects the medial portion of the two stabilizing rods and is adapted to impart a tensile stress in each stabilizing rod in response to a tensile stress in the tension rod. The resulting pre-stressed H-shaped configuration of rods comprises the basic component of the stabilizing system by joining the parallel longitudinal frame members at dual spaced apart connections on each and effects a resultant tensile stress diagonally across the H. The tensile stresses in the members of the H-shaped system are counterbalanced by lateral stiffening members adapted to receive compressive stresses. The resulting interaction of forces in this novel construction imparts structural rigidity to the trailer frame.

Referring to the drawings:

FIG. 3 is a section taken substantially on line 3—3 of FIG. 1;

FIG. 4 is a side elevation, partly broken away, of a stabilizing rod anchor;

FIG. 5 is an end view, partly broken away and in section, of the anchor shown in FIG. 4;

FIG. 6 is a view similar to FIG. 4 of a modified anchor; and

FIG. 7 is a bottom plan view of the modified anchor shown in FIG. 6.

The frame of the trailer is indicated generally at 9, and preferably includes laterally spaced longitudinal members 10 connected at their rear ends by a transverse member 11 and connected at the front ends by converging members 12. The members 12 form a V at the front end of the vehicle to which a suitable hitch may be attached to connect the trailer to the towing vehicle. Lateral compression members 13 and 14 are preferably connected to the medial portion of longitudinal members 10, as more fully hereinafter described. The bed of the trailer is supported directly on the frame members.

Figure 2:
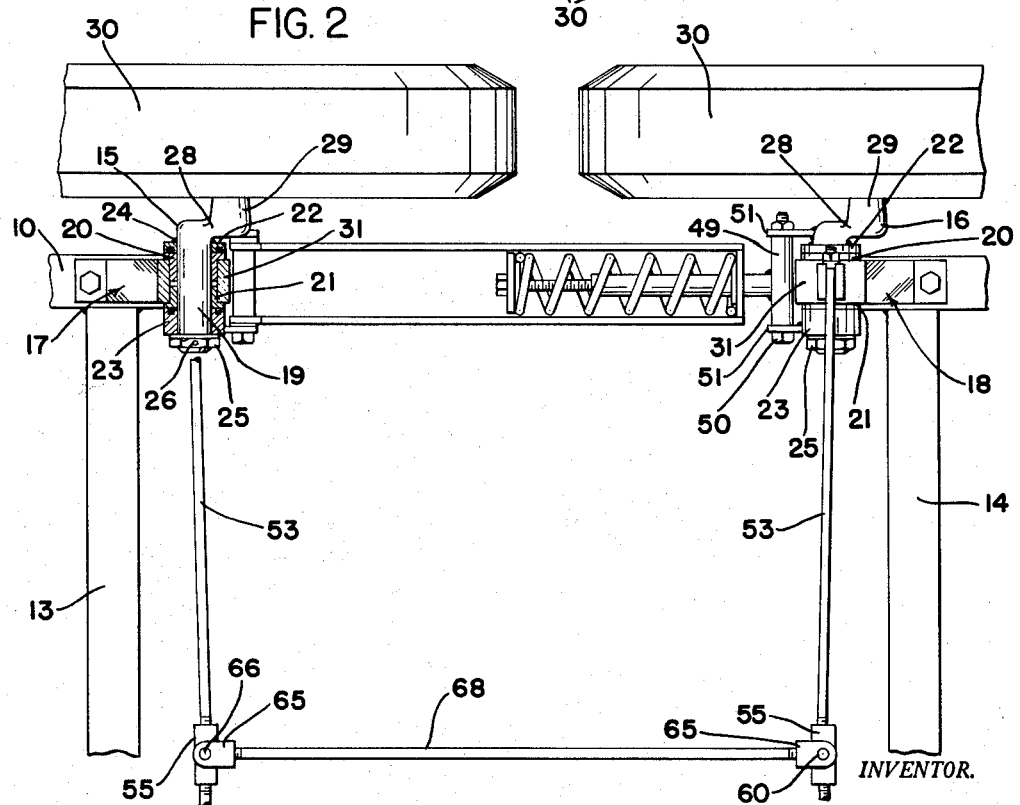
FIG. 2 is an enlarged fragmentary bottom plan view thereof.

A front axle 15 and a rear axle 16 are independently mounted in angle brackets 17 and 18, respectively on each longitudinal member 10 in tandem. As best shown in FIG. 2, the axles 15 and 16 have a stub shaft portion 19 journaled in flanged sleeve bearings 20 and 21 which are axially maintained by collars 22 and 23, respectively. The axially outer collar 22 is preferably secured to shaft portion 19, as by welding 24. However, to facilitate removal of the shaft the inner collar 23 is axially secured to shaft portion 19 by a nut 25 screwed onto the end of shaft portion 19 and locked, as by cotter pin 26. The collars 23 are secured to their respective axles 15 and 16 in any suitable manner, as by a key (not shown), so that the collars will rotate with the axles.

Axially outwardly of shaft portion 19 the axles 15 and 16 each have a crank arm 28 which terminates at its outer end in a spindle 29 on which a wheel 30, equipped with a conventional pneumatic tire, is mounted. The wheels 30 are journaled on spindles 29 in a suitable and well known manner.

The flanged bearings 20 and 21 embracing the shaft portion 19 of axles 15 and 16 are received in a journal box 31 on angle bracket 17 or 18, respectively. Angle brackets 17 and 18 are preferably of the type disclosed in the applicant's copending application Serial No. 47,775, filed August 5, 1960. As best shown in FIG. 3, the angle brackets 17 and 18 each have a mounting leg 32 through which bolts 33 are secured to frame member 11. Journal mounting leg 34 depends perpendicularly from leg 32 downwardly from frame member 11 terminating in journal box 31 extending outwardly of brackets 17 and 18 in an opposite direction from leg 32. A knee brace 35 may be provided between legs 32 and 34 to improve structural rigidity. A recess 36 is defined between frame member 10 and journal box 31 for a purpose more fully hereinafter described.

The front axles 15, each have lever arms in the form of pairs of bracket ears 38 associated therewith. Ears 38 may be attached one to axle 15 and the other to collar 23, as by welding, so as to straddle the bracket 17 and extend rearwardly toward axle 16. Pivotally mounted between each pair of ears 38 by a bolt 39 is the bored stirrup-shaped end 40 of merged bars 41 which form a framework around helical spring 42. A plate 43 is secured to the rear ends of bars 41 against which spring 42 can abut.

The other end of each spring 42 abuts a plate 44 freely movable axially of the framework formed by bars 41. A rod 45 passes through and engages plate 44 with the head 46 on one end. The other end is threaded and is adjustably screwed into one end of a coupling pin 48, also encircled by spring 42. Pin 48 extends slidably through plate 43, and is secured to transverse sleeve 49 pivotally mounted, as by bolt 50, between a pair of lever arms in the form of bracket ears 51, which extend forwardly from axle 16. The ears 51 are centered in longitudinal alinement with the respective front bracket ears 38 so that the spring assemblies, designated generally by the numeral 52, extend substantially longitudinally of the vehicle. Pivot bolts 39 and 50 are preferably substantially horizontally aligned to position the spring assemblies 52 horizontally. The construction and mounting of the springs between the two axles provides for a relatively low trailer bed as more fully pointed out in the applicant's copending application Serial No. 47,775, filed on August 5, 1960.

Stabilizing rods 53 are disposed substantially laterally between longitudinal frame members 10 and each has one end secured in an anchor assembly 54 and the other end threaded into a coupling 55. The anchor assemblies 54 are preferably positioned on the lowermost portion of angle brackets 17 and 18 and comprise a downwardly depending pair of spaced apart lugs 56. Stabilizing rod 53 is anchored in the space 58 between the adjacent lugs 56 and retained therein by a washer 59 which is received in the retaining notch 60 on the outer edge of lugs 56. A nut 61 is threaded onto each rod 53 and is tightened against washer 59 to secure the rod 53 in anchor assembly 54.

Preferably a hard rubber filler 62 is positioned in space 58 into which rod 53 imbeds to dampen excessive vibration thereof. The interaction of the filler 62 against rod 53 also prevents the vibrations from working the filler 62 out of space 58.

In FIGS. 6 and 7, a modified washer 63 is shown which has inwardly turned lips 64 at the ends adapted to engage the outermost sides of lugs 56 to prevent them from spreading when subjected to severe shocks.

Figure 1:
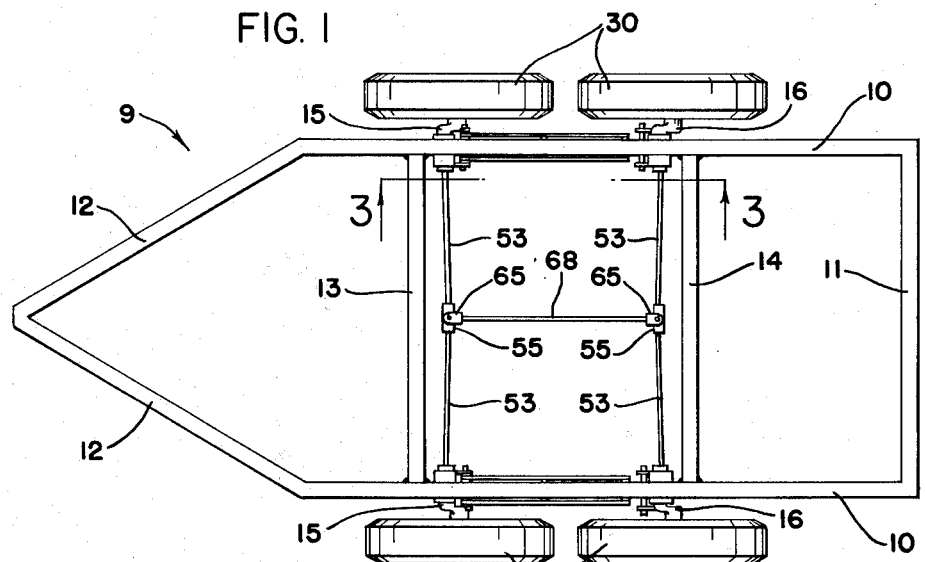
FIG. 1 is a top plan view of a relatively small trailer vehicle embodying the invention.

Clevis coupling 65 are fastened to couplings 55 by pins 66 on which they may pivot. A tension rod 68 is adapted to be threaded into clevis couplings 65 in such a way as to cause convergence of the clevis couplings 65 at opposite ends of tension rod 68 by turning rod 68. As best shown in FIGS. 1 and 2, the rod 68 has tensioned length less than the length or distance between the outboard ends of the rods 53. This may be accomplished by threads of opposite hand on each end of tension rod 68 or by utilizing a turnbuckle (not shown) in conjunction with rod 68.

The stabilizing rods 53 and tension rod 68 are joined together in an H-shaped configuration and connected into the longitudinal frame members 11 by an anchor assembly 54 on each angle bracket 17 and 18.

Tightening of bolts 61 applies a tensile stress to the stabilizing rods 53 through coupling 55. Effecting a tensile stress in tension rod 68 creates an effective cross stress between the front and rear anchor assemblies 54 on opposed longitudinal frame members 10.

The lateral forces induced by the tensioning of stabilizing rods 53 are opposed by the lateral stiffening members 13 and 14 and the effective cross stress imposed by tension rod 68 stabilizes the box frame, formed by members 10, 13 and 14, by urging a fixed diagonal dimension.

What is claimed is:

1. A trailer frame comprising, longitudinal frame members, journals on said longitudinal frame members, tandem floating axles journaled in said journals, lateral stiffening members between said longitudinal members, stabilizing rods laterally between said longitudinal members, pairs of anchor lugs extending beneath each journal, each said pair of lugs having a space therebetween adapted to receive an end portion of one of said stabilizing rods, a resilient filler in said space into which said rod imbeds, fastening means engaging said rod to said pair of lugs in which it is received, a tension rod connecting said stabilizing rods medially of said longitudinal frame members in an H-shaped assembly, application of tensile stress to said tension rod adapted to impart a tensile stress to said H-shaped assembly.

2. A trailer frame comprising, longitudinal frame members, journals on said longitudinal frame members, tandem floating axles journaled in said journals, lateral stiffening members between said longitudinal members, stabilizing rods laterally between said longitudinal members, pairs of anchor lugs having laterally oriented sides and transverse edges extending downwardly of said frame beneath each said journal, each of said pairs of lugs having a space therebetween adapted to receive an end portion of one of said stabilizing rods, a resilient filler in said space into which said rod imbeds, a notch on the outer edge of said lugs, a washer fastened to the outer end portion of each of said stabilizing rods, said washers adapted to be received in their respective notches, a tension rod connecting said stabilizing rods medially of said longitudinal frame members in an H-shaped assembly, application of tensile stress to said tension rod adapted to impart a tensile stress to said H-shaped assembly.

3. A trailer frame comprising, longitudinal frame members, journals on said longitudinal frame members, tandem floating axles journaled in said journals, lateral stiffening members between said longitudinal members, stabilizing rods laterally between said longitudinal members, pairs of anchor lugs having laterally oriented sides and transverse edges extending downwardly of said frame beneath each said journal, each of said pairs of lugs having a space therebetween adapted to receive an end portion of one of said stabilizing rods, a resilient filler in said space into which said rod imbeds, a notch on the outer edge of said lugs, a washer fastened to the outer end portion to each of said stabilizing rods, said washers adapted to be received in their respective notches, said washers having inwardly extending lips adapted to engage the outer sides of said lugs, a tension rod connecting said stabilizing rods medially of said longitudinal frame members in an H-shaped assembly, application of tensile stress to said tension rod adapted to impart a tensile stress to said H-shaped assembly.

4. A trailer frame comprising, longitudinal frame members, lateral stiffening members extending between said longitudinal frame members, a pair of angle brackets attached to each of said longitudinal frame members, independently floating axles adapted for rotatably mounting wheels journaled in each of said angle brackets, lever arms on said axles on each side of said angle brackets, a compression spring assembly extending longitudinally between the axles supported by each pair of angle brackets, means connecting the opposite ends of said spring assembly to the lever arms on the axles supported by each pair of angle brackets to absorb relative movements of the frame and wheels by compression of said spring, stabilizing rods extending laterally between said angle brackets, a pair of anchor lugs each having a space therebetween adapted to receive an end portion of one of said stabilizing rods extending downwardly from each of said angle brackets, fastening means engaging each of said rods to one pair of said anchor lugs, and a tension rod connecting said stabilizing rods medially of said longitudinal frame members in an H-shaped assembly, application of tensile stress to said tension rod adapted to impart a tensile stress of said H-shaped assembly.

5. A trailer frame comprising, a pair of longitudinal frame members, lateral stiffening members extending between said longitudinal members, a pair of angle brackets attached to each of said longitudinal frame members, a journal support leg on each bracket extending downwardly from said frame, a journal box attached to each of said journal support legs downwardly of said frame, independent floating axles adapted for rotatably mounting wheels journaled in each of said angle brackets, lever arms in the form of bracket ears rotatable with each of said axles straddling the corresponding journal and extending substantially toward each other, compression spring means between said axles extending longitudinally of said frame, and means connected to the bracket ears of both axles for compressing said spring means in response to relative movement of the frame and the wheel on each of said axles, the juncture of said connection means and said bracket ears on at least one of said axles adapted to be rotated between said journal and said frame, stabilizing rods extending laterally between said angle brackets, a pair of anchor lugs having a space therebetween adapted to receive an end portion of one of said stabilizing rods extending downwardly from each of said angle brackets, fastening means engaging said rod to said lugs, and a tension rod connecting said stabilizing rods medially of said longitudinal frame members in an H-shaped assembly, application of tensile stress to said tension rod adapted to impart a tensile stress to said H-shaped assembly.

6. A trailer frame comprising, a pair of longitudinal frame members, lateral stiffening members extending between said longitudinal members, a pair of angle brackets attached to each of said longitudinal frame members, a journal support leg on each bracket extending downwardly from said frame, a journal box attached to each of said journal support legs downwardly of said frame, independent floating axles adapted for rotatably mounting wheels journaled in each of said angle brackets, lever arms in the form of bracket ears rotatable with each of said axles straddling the corresponding journal and extending substantially toward each other, compression spring means between said axles extending longitudinally of said frame, and means connected to the bracket ears of both axles for compressing said spring means in response to relative movement of the frame and the wheel on each of said axles, the juncture of said connection means and said bracket ears on at least one of said axles adapted to be rotated between said journal and said frame, stabilizing rods extending laterally between said angle brackets, a pair of anchor lugs having laterally oriented sides and transverse edges extending downwardly from each of said journaled boxes, each of said pairs having a space therebetween adapted to receive an end portion of one of said stabilizing rods, a notch on the outer edge of said lugs, a washer fastened to the outer end portion of each of said stabilizing rods, said washer adapted to be received in said notch, a tension rod connecting said stabilizing rods medially of said longitudinal frame members in an H-shaped assembly, application of tensile stress to said tension rod adapted to impart a tensile stress to said H-shaped assembly.

7. In a trailer having a frame, said frame having spaced apart longitudinal side members and compression members extending laterally between and connected to said side members, front and rear journal means attached to each of said side members, and front and rear independently floating axles mounted in each of said journal means, an H-shaped tension assembly, said H-shaped tension assembly comprising two spaced apart laterally oriented stabilizing rods extending between said side members, the ends of each stabilizing rod anchored to a side member below a journal means, a tension rod connected between the medial portions of said stabilizing rods, means for creating a tensile stress in said tension rod, the application of a tensile stress in said tension rod imparting tension in said stabilizing rods, the tensile stresses of the members of said H-shaped assembly inducing compressive stresses in said compression members, the resulting interaction of forces from said tensile and compressive stresses imparting structural rigidity to said frame.

8. In a trailer having a frame, said frame having spaced apart longitudinal side members, front journal means attached to each of said side members, a compression member extending laterally between and connected to said side members in proximity to said front journal means, rear journal means attached to each of said side members, a second compression member extending laterally between and connected to said side members in proximity to said rear journal means, and front and rear independently floating axles mounted in said journal means, an H-shaped tension assembly, said H-shaped tension assembly comprising two spaced apart laterally oriented stabilizing rods extending between said side members, one said stabilizing rod being anchored to said side members below the journal means in which said front axles are mounted and the second said stabilizing rod being anchored to said side members below the journal means in which said rear axles are mounted, a tension rod connected between the medial portions of the two said stabilizing rods, means for creating a tensile stress in said tension rod, the application of a tensile stress in said tension rod imparting tension in said stabilizing rods, the tensile stresses of the members of said H-shaped assembly inducing compressive stresses in said compression members, the resulting interaction of forces from said tensile and compressive stresses imparting structural rigidity to said frame.

References Cited in the file of this patent
UNITED STATES PATENTS

| | | |
|---|---|---|
| 1,127,429 | Garst | Feb. 9, 1915 |
| 1,453,954 | Scholtes | May 1, 1923 |
| 1,954,637 | Linn | Apr. 10, 1934 |
| 2,982,580 | Lewis | May 2, 1961 |

FOREIGN PATENTS

| | | |
|---|---|---|
| 608,558 | France | Apr. 24, 1926 |